United States Patent
Devanbu

(12) 
(10) Patent No.: US 6,681,371 B1
(45) Date of Patent: Jan. 20, 2004

(54) SYSTEM AND METHOD FOR USING CONTAINER DOCUMENTS AS MULTI-USER DOMAIN CLIENTS

(75) Inventor: Premkumar T. Devanbu, Davis, CA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/469,169

(22) Filed: Dec. 21, 1999

Related U.S. Application Data

(60) Provisional application No. 60/113,233, filed on Dec. 21, 1998.

(51) Int. Cl.[7] .......................... G06F 15/00; G06F 9/44; G06F 9/00
(52) U.S. Cl. .................. 715/515; 717/123; 709/328
(58) Field of Search .................. 717/162–178, 717/123; 707/200–201; 709/205, 216, 219, 235, 310, 312, 320, 332, 328; 715/500, 500.1, 502–503, 513, 515, 516, 530; 345/804, 720, 716, 717, 719, 723, 727, 733

(56) References Cited

U.S. PATENT DOCUMENTS

| | | | | |
|---|---|---|---|---|
| 4,933,880 A | * | 6/1990 | Borgendale et al. | 715/515 |
| 5,781,732 A | * | 7/1998 | Adams | 709/205 |
| 5,870,764 A | * | 2/1999 | Lo et al. | 707/203 |
| 6,054,985 A | * | 4/2000 | Morgan et al. | 345/804 |
| 6,263,379 B1 | * | 7/2001 | Atkinson et al. | 709/332 |

* cited by examiner

*Primary Examiner*—Hoang-Vu Antony Nguyen-Ba

(57) ABSTRACT

A multi-user domain is implemented in a compound document framework to collaboratively modify a compound document in accordance with a concurrency model. A server hosts a multi-user domain in which a plurality of clients participate. The multi-user domain includes a compound document having a shared container part and at least one shared content part. Each participating client can use its own part editors to modify the document. Modification information is sent to the server, which updates the shared document to other clients in accordance with a concurrency model.

20 Claims, 3 Drawing Sheets

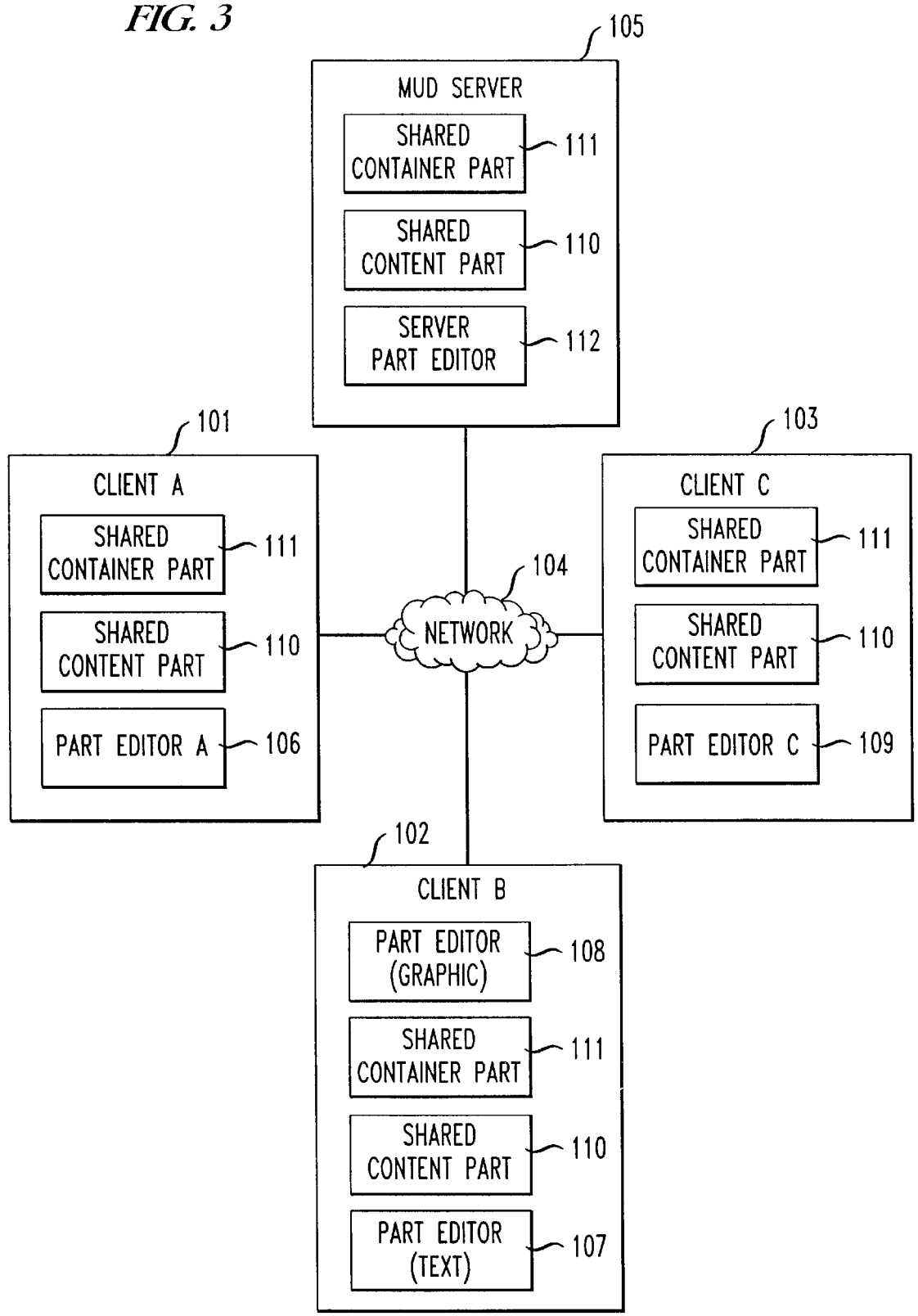

SYSTEM AND METHOD FOR USING CONTAINER DOCUMENTS AS MULTI-USER DOMAIN CLIENTS

CROSS-REFERENCE TO RELATED APPLICATIONS

This application claims the benefit of U.S. provisional application 60/113,233 filed on Dec. 21, 1998.

BACKGROUND OF THE INVENTION

Desktop applications have grown significantly in both size and functionality, mostly in response to the demands of users for more features. For example, the Word word-processing program manufactured by the Microsoft Corporation of Redmond, Wash., is reputed to include about four million lines of software code. Software vendors have found that application development costs, schedules and quality control issues escalate in a non-linear fashion (e.g., exponentially) as the size of the application increases.

Much of the same functionality is provided in different applications. For example, word processors, presentation software and spreadsheets all usually include font packages, i.e., software code that controls the presentation of text by these applications. These applications also all can include spell checkers, table layout software, illustration software, etc. This means that there is redundant code in different software applications.

Vendors have simplified software structures, increased reuse and improved quality by developing interoperable compound document models. A traditional (non-compound) document is a monolithic structure that is stored in a single uniform file, and is processed by a single application. The traditional document can include different elements, such as pictures, words, tables, graphs, etc., but every part of the document is composed, changed and saved (e.g., to a hard disk) using a single application that is typically purchased from a single vendor.

For example, a given document includes two pieces of text, a graphic, and a spreadsheet. The entire document is handled by a single application, such a word processor (such as Word) that incorporates the functionality necessary to handle all of the different elements. Typically, a user will cut and paste elements from other applications via a temporary memory area provided by the operating system, such as the clipboard. For example, a spreadsheet created in a spreadsheet application such as Quattro Pro, manufactured by the Borland Corporation, is cut from the spreadsheet application and pasted into a document being handled by the word processing application. In another example, a drawing can be created using an application such as the Illustrator application manufactured by the Adobe Corporation and clipped out and pasted into a Word document. The drawing can also be stored as a separate file and then inserted into the Word document using the Word application. However, it is typically not possible to modify the inserted or pasted element without leaving the word processor. In some cases, it is indeed possible to use the word processing application to edit elements created by other applications and inserted into a document handled by the word processor. But this functionality has been added to the word processor at considerable expense. Such added functionality is responsible for the runaway increase in size, complexity and inefficient redundancy in desktop applications, such as word processors.

Compound document frameworks are the desktop software industry's attempt to correct this situation. In the compound document paradigm, a document is no longer monolithic, but rather a heterogeneous assemblage of different "parts." Thus, the example document discussed above includes four different "parts" (the two text parts, the spreadsheet part, and the graphic part) or three "part types" (text, spreadsheet and graphic). All of these "parts" are contained with a "container part." The container part helps describe the relationships of the parts that it includes. This represents a redesign of the architecture of, for example, document manipulation software. Parts that are not container parts are called "content parts." Examples of content parts include a text part, a graphic part, a spreadsheet part, etc.

Unlike traditional documents, compound documents are not manipulated by a single document editor. Rather, each part type of the document is handled by a separate, independent "part editor." For the example document discussed above, there are three part type editors: one for text, one for spreadsheets and one for graphics. A part editor is software adapted to modify a part of a compound document, and can include an animation editor, a video editor, an audio editor, and a software development editor. These part editors work cooperatively. As the user moves her cursor from one part of the document to another, the appropriate part editor becomes active. Different menu bars and buttons can appear that give the user options for manipulating the part over which the cursor lies. Each part editor is an independently created piece of software. Each editor handles its own interaction with the user, printing a part, and sending representations of that part to and from persistent storage (e.g., a hard disk) and/or to and from networks.

Part editors offer an important advantage to the user because the graphic editor can be used inside a document, a presentation, a source code editor, etc. in the same way, i.e., with the same or substantially the same interface. This is superior to traditional systems where the user must learn to use a different interface to do the same thing (e.g., manipulate a graphic) in every different application she uses. There can also be many different part editors of the same type, e.g., many different graphic editors. The user can advantageously choose her favorite, and then use it for all documents that conform to the compound document model.

The compound document model also creates opportunities for small independent companies to create and sell software for manipulating documents, because the high cost of entry into the desktop software market is lowered because of the smaller size of part editors compared to traditional, multi-functional applications. This can increase competition, spur innovation and create new options for the user.

A part editor is typically created in the context of a particular software framework, such as OpenDoc, created by the Apple Computer company of Cupertino, Calif. (see <http://www._opendoc._com, visited Dec. 19, 1999>, Object Linking and Embedding (OLE), created by the Microsoft Corporation, etc.

Compound document frameworks have been intended for use on desktops. Certain known systems have individual parts that can automatically update themselves from remote network locations. For example, the CyberDog OpenDoc container application (see <http://www.cvberdog.org/, visited Dec. 19, 1999>can include a HyperText Transfer Protocol (HTTP) client that updates itself via client pull or server push technology. However, known compound distributed document frameworks such as CyberDog are disadvantageously not network-enabled in a uniform, intuitive and general manner.

A shared computing environment such as a Multi-User Domain (MUD) and MOO is an electronic community to which many users can connect. Such a shared environment typically provides text-based facilities for virtual conversations, creating extensions to the shared environment, creating and programming software objects in the shared environment, etc. Examples of such environments include LambdaMOO (see <http://_vesta._physics._ucla._edu/~smolin/lambda/, and lambda.moo.mud.org 8888, visited Dec. 19, 1999>, TinyMOO (a MUD Object-Oriented that is designed for social interaction), etc. MUD users connect to MUD servers using ASCII (text, ASCII Character Set Revised, ANSI X3.1 10-1983, ftp://dkuu.dk/i18n/WG15-collection/charmaps/ANSI X3.110-1983 visited Dec. 19, 1999>) client such as emacs, or even a terminal. Commands can be used to produce utterances (e.g., "Hello, Bob"), emote (e.g., "Bob waves"), traverse the MUD or MOO world (e.g., go north), etc. There are different regions (known as rooms) in the environment. A room can contain objects that respond to typed-in commands. Interactions (i.e., conversations and emotes) are typically confined to the room in which the user is located at the time the utterance is made by the user.

MUDs and MOOs have powerful programming facilities that allow users to create richly interactive domains, interconnect them in interesting ways, and fill them with inviting objects. However, MUDs and MOOs have several important shortcomings. They are disadvantageously limited to using ASCII characters, i.e., they provide no Graphical User Interface ("GUI"). MUDs and MOOs also disadvantageously are only very superficially integrated with the desktop. Thus, although ASCII strings can be cut and pasted from desktop applications, it is not possible to drag and drop images, graphics, tables, etc. from desktop applications into the MUD or MOO client. The MUD/MOO software is disadvantageously isolated from the desktop. It is not possible to interoperate desktop software elements (e.g., OLE, OpenDoc, etc.) with a MUD/MOO client. For example, to add fonts and images to a MOO, it is necessary to re-implement and introduce those functions into the MOO software.

SUMMARY OF THE INVENTION

In accordance with an embodiment of the present invention, a MUD client is implemented as a container document in a compound document framework. A distributed version of the compound document framework is created while advantageously retaining the social and/or cognitive aspects of the MUD/MOO experience, and the user experience, software architecture, and software reuse features of the compound document environment.

One embodiment of the present invention includes a system for modifying a compound document in a client/server architecture. A client having a client processor executes client compound document multi-user domain software. A client memory is coupled to the client processor. The client memory stores a copy of a shared container part of a compound document, a shared content part of the compound document, and a client part editor.

The client is coupled to a MUD server, e.g., through a network. The server has a server processor that executes server compound document multi-user domain software. The server also has a server memory that is coupled to the server processor. The server memory stores a copy of the shared container part of the compound document, a shared part of the compound document, and a server part editor. The server receives a part modification signal from said client, modifies the shared part of the compound document, and sends a signal to the client updating the client's copy of the modified shared part of the compound document. The signal is sent to the client, and can be sent to other clients, in accordance with a concurrency model.

BRIEF DESCRIPTION OF THE DRAWINGS

FIG. 3 shows a system in accordance with an embodiment of the present invention.

DETAILED DESCRIPTION

Figure 1:
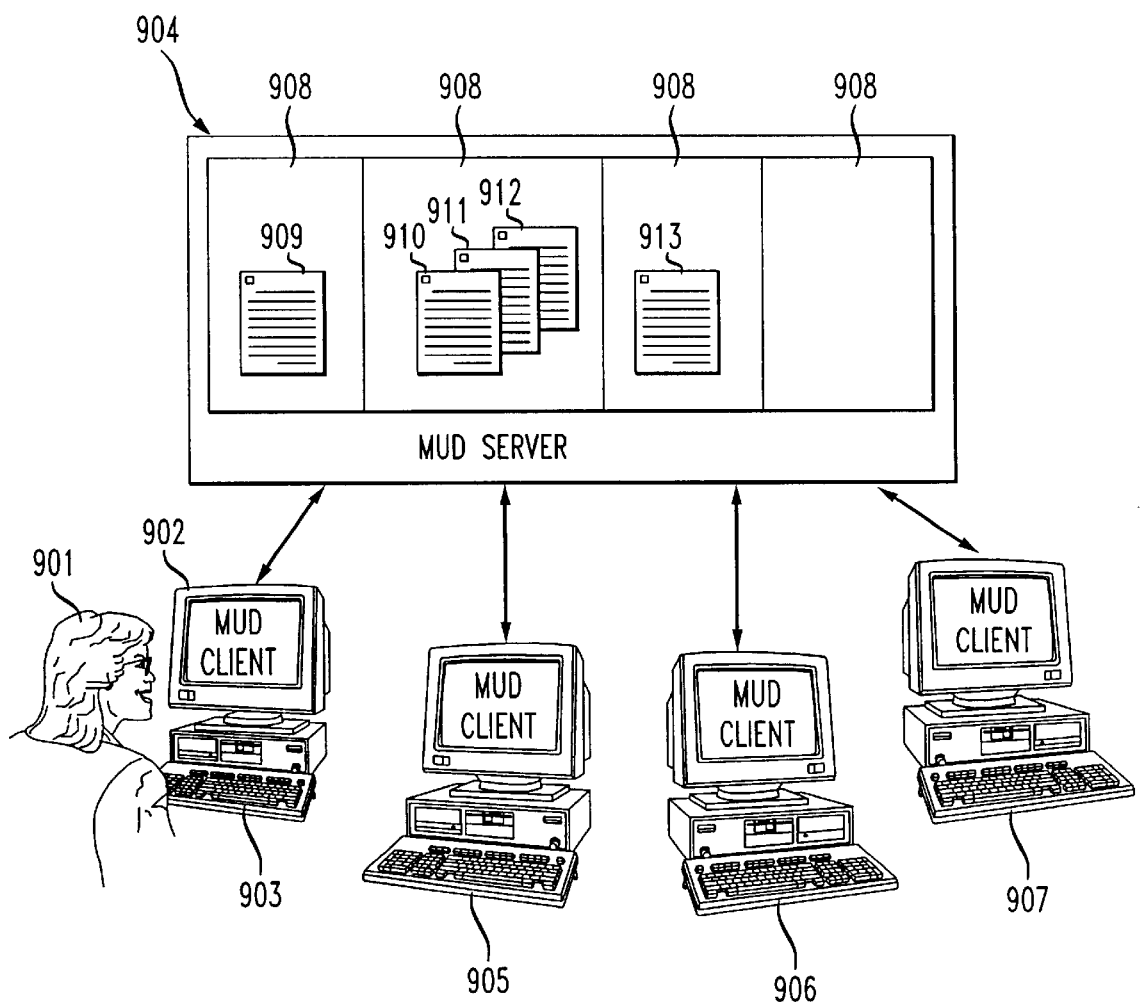
FIG. 1 shows a overview of the system in accordance with an embodiment of the present invention.

An embodiment of the present invention implements a MUD client as a container document in a compound document framework, advantageously combining the social and cognitive aspects of a MUD/MOO with the software reuse, software architecture and user experience advantages of the compound document framework. A document can advantageously be modified collaboratively by several users in accordance with an embodiment of the present invention.

In accordance with an embodiment of the present invention, a document includes several different parts, including text, a spreadsheet, a graphic, and a new kind of part ("chat part") that corresponds to a traditional chat session client. For example, the chat part can be a window in which several users can converse by entering text at their respective computers, as is done with chat rooms known in the art. Information about the document (e.g., a uniform view of the document) is distributed to several users, thereby creating a shared view of the document. The shared view corresponds to a single container document that is maintained by a server coupled to the user computers ("clients"), e.g., through a network. All users that connect to the same room at the server share the same view. Further, the single, shared container document is a first-class participant in the user's desktop. In other words, it functions very much like a locally stored container document at each client. The user can advantageously drag and drop parts form the MUD client into her desktop, or into another compound document in her desktop.

For example, suppose that Bob and Jackie have each created a graphic and a spreadsheet on their respective computers. Each drags and drops their respective element into the MUD client container, whereupon these elements become visible to the other users who are connected to this particular part (room) of the MUD. Bob and Jackie and the rest of the users in the room can advantageously have a conversation about the shared view document, discuss changes, print copies, etc. More than one container document can be shown in a single room.

The present invention advantageously leverages part types and part editors that are already integrated into the desktop, providing a high level of interoperability with the MUD/MOO world. Users' familiarity with existing part editors (drawing tools, spreadsheets, etc.) facilitates document modification.

Compound document parts that are shared between geographically distributed containers can have different models of concurrency, i.e., keeping every user's view concurrent with the present state of the document. Different parts of the compound document warrant consideration with respect to the concurrency model. Static parts are typically created once and are not subsequently modified. Examples of static parts can include titles, company affiliations, e-mail addresses, portals to other rooms in the MUD, etc. Background parts are updated automatically. Examples of background parts include a part that displays the number and identities of users connected to that particular room; a stock ticker; a current weather map, etc. A single user part is a part that is controlled by a single user, but which can be viewed by everyone. For example, there can be a spreadsheet that can be seen and discussed by everyone, but can only be modified by a manager. A single thread part is a part that only one person can modify at one time. For example, a MUD participant "checks out" a part for modification, performs the modification visible to all other participating users, and then "checks in" the part, whereupon it becomes available for check-out by another participant. A fully concurrent part can be modified by more than one participant at once, e.g., a whiteboard. It is generally preferable to choose the lowest level of concurrency (which proceeds from lowest to highest from static parts to fully concurrent parts as discussed above) that would be acceptable for a given task. Fully concurrent parts should be used only in the most unusual circumstances, since this type of part demands a great deal of traffic over the communications medium.

Rooms, which are container documents in accordance with an embodiment of the present invention, can support different levels of concurrency in terms of how parts are added, deleted or restructured (e.g., in terms of layout) within the document. In compound document models such as OpenDoc, containers are considered to be parts themselves, so the same set of concurrency models described above applied to containers. Again, the lowest acceptable level of concurrency should be chosen.

An embodiment of the present invention is implemented so that the shared use of each part editor is as similar as possible to the use of the same part editor in a non-shared environment. The only differences are related to the particular model of concurrency in effect. Further, the part editor should be reused to the greatest extent possible. All levels of concurrency should be available for each type of part whenever possible.

FIG. 1 shows the system architecture in accordance with one embodiment of the present invention. A user 901 connects to the compound document MUD by starting a MUD client 902 at the user computer 903, and then logging in to the MUD server 904. The client is connected to one of several "rooms" 908. Each room can include one or more compound documents 909, 910, 911, 912 and 913. She is made aware of other clients 905, 906 and 907 connected to that room, and can advantageously participate in editing the parts that constitute the one or more compound documents in that room.

The MUD clients in this embodiment are compound document containers, each of which contains other parts. Both containers and parts are controlled by software that handles initialization, user interface events, storage management for storing contents, rendering or viewing elements for presenting an up-to-date image of the part contents in storage, layout negotiation to handle proper physical location of the part viewer within a compound document (or vice versa), etc. In the case of OpenDoc, part editors are implemented by extending an object-oriented framework. In terms of the C++ or Java programming languages, this is accomplished by writing about 60 virtual functions that handle all of the functionality described above in a manner specific to the part. Of course, the existing OpenDoc framework does not handle the distributed and concurrent aspects in accordance with an embodiment of the present invention.

Figure 2:
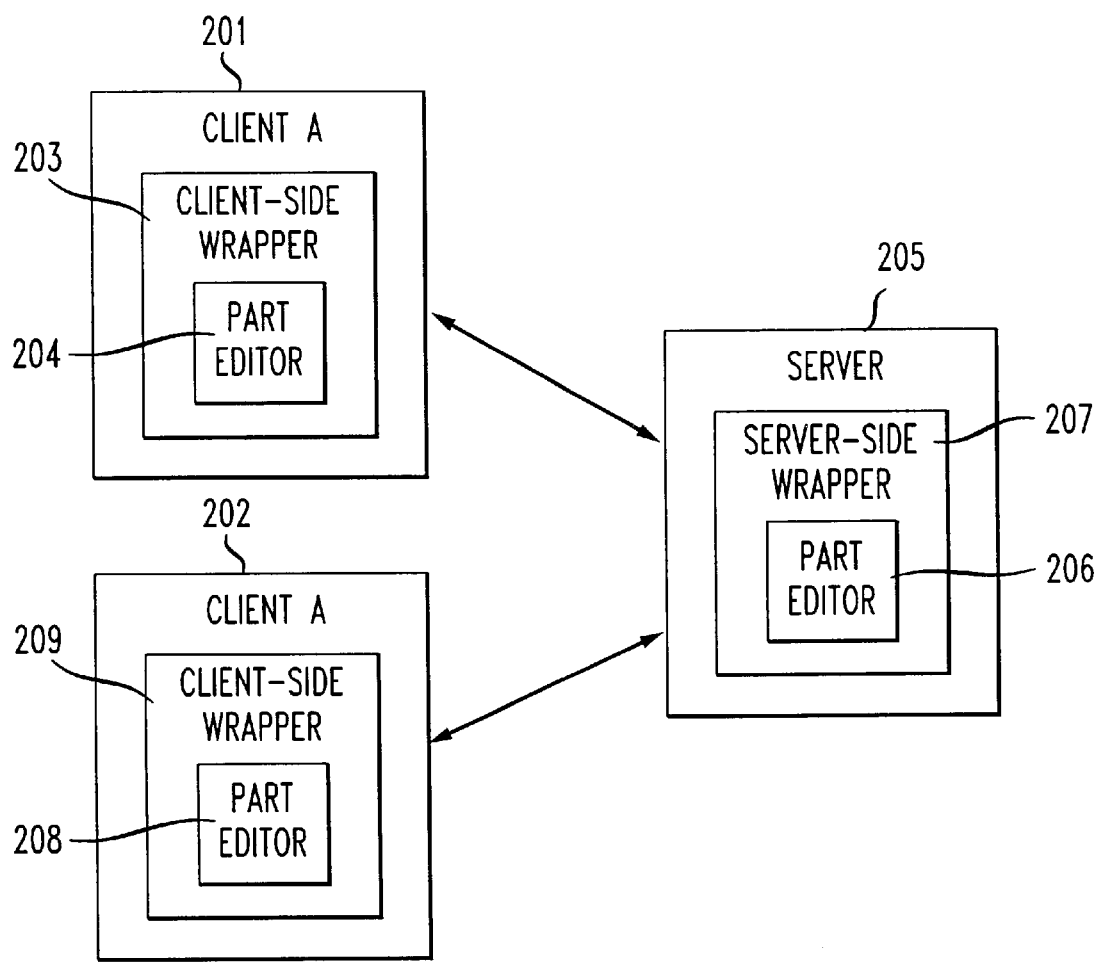
FIG. 2 shows part editors encapsulated by wrappers in accordance with an embodiment of the present invention.

In accordance with an embodiment of the present invention, existing part editors are advantageously adapted to the MUD container model with minimal impact on the code for the existing part. This can be achieved by wrapping the implementation of existing part editors. A part editor can be used intact without software modifications. Each part editor is wrapped using a "MUD wrapper" that handles the appropriate distribution and concurrency control mechanisms. The same architecture obtains for both container editors and part editors. For each type of concurrency, a pair of wrappers are implemented, one for the client side and one for the server side. The wrappers forward certain calls to the wrapped part editor, and handle certain calls made from the part editors. In this sense, both the client and server side wrappers allow the part editor to pretend that it is operating in a non-distributed environment. The appropriate "up" calls (from client to server) and "down" calls (from server to client) are forwarded to the appropriate part. For example, as shown in FIG. 2, suppose that the concurrency model is that only Client A 201 is permitted to make changes, and Client B 202 is only an observer. In this case, the wrapper 203 for A 201 possesses all of the edit and update user interaction calls directly to the part editor 204 that it wraps, which handles the calls in the non-distributed fashion. However, all storage calls made by part editor A 204 are handled differently. Besides updating the storage at A 201, they are also sent to the server 205, which updates its representation of the part using its own part editor 206, which can have its own wrapper 207. Screen repaint or redisplay calls from A 201 are similarly sent to the server 205, and are also broadcast to all other clients such as B 202 which are currently viewing that part. Attempts by B 202 to modify the part are not passed on to the part editor B 208. Rather, they are intercepted by wrapper B 209 and discarded, and a warning is issued to B 202.

Other concurrency models are advantageously handled by a suitable choice of client and server side wrappers. In generally, it may not always be possible to produce distributed versions of parts and containers by simply wrapping existing part editors. In this case, it may be necessary to modify the part editors themselves.

When a new part (or container) is created, the creator signals to the MUD client software the type of concurrency that is applicable. Using an appropriate factory class or method, the appropriate part editors (e.g., the conventional OpenDoc-type part or container editor) are created. Then the appropriate client and server side wrapper, applicable to the desired style of concurrency is created. Then a handle to the part editors are sent to the wrappers, which manage the interactions of the part with the client-side display, the client's commands, and the server.

An embodiment of the present invention implements a shared environment client as a container document in a compound document architecture to create and edit a newsletter. Within the container, part editors cooperate to modify various portions of a data object, e.g., information (such as a computer-readable file) from which the newsletter can be generated. As used herein, the term "modify" includes creating, changing, deleting, printing and saving a data object or any portion thereof. Because the container is a shared environment client, a plurality of users can advantageously use their respective parts editors in a collaborative fashion, sharing any change any one user makes to the data object at about the time the change is made.

FIG. 3 shows a system in accordance with an embodiment of the present invention. Client A 101, Client B 102 and Client C 103 are coupled to network 104. Server 105 is also coupled to network 104. The Clients 101, 102 and 103 each implement their respective parts editors, which are not necessarily shared. For example, Client A 101 implements a first type of text editor (text editor A 106), while Client B 102 implements another type of text editor B 107. Client B also implements a graphic editor 108, while Client C implements a spreadsheet program (editor) 109. Each of the Clients 101, 102 and 103 edit a data object (not shown, e.g., the newsletter) that includes a text portion, a graphics portion, and a spreadsheet portion. Each of these is a "shared content part" of the compound document, only one of which is shown in FIG. 3 as 110.

In the embodiment shown in FIG. 3, a shared container part 111 is implemented using Server 105, as are the shared content parts (compound document parts other than a container part). In another embodiment (not shown), the shared container part for the data object is implemented on a peer-to-peer basis among the Clients, and does not rely upon a Server. In another embodiment, one of the Clients functions as the Server, coordinating communications between itself and the other Clients as to changes made to a data object.

In an embodiment of the present invention, the shared container part 111 coordinates modifications made to a data object by any part editor on a Client. In other words, Clients editing a data object share a view of the object, the shared view being provided by the shared container part 111 in accordance with the present invention. A modification caused by one Client is communicated to the other Clients working on the same data object, i.e., through the server 105, and the other Clients can see and/or hear the modification. Server 105 also includes a part editor 112 in FIG. 3.

In accordance with an embodiment of the present invention, the MUD server includes a processor, memory and a port. The processor can be a general purpose microprocessor, such as the Intel Pentium III processor, made by the Intel Corporation of Santa Clara, Calif. In another embodiment, processor is an Application Specific Integrated Circuit (ASIC), which is designed to implement in hardware at least part of the method in accordance with an embodiment of the present invention. Alternatively, the processor is comprised of a combination of a general purpose microprocessor and an ASIC.

The server memory is any device adapted to store digital information, such as Random Access Memory (RAM), Read Only Memory (ROM), a hard disk, a floppy disk, flash memory, etc. The memory should be at least partly writeable in accordance with the present invention. The memory is coupled to processor, and stores server compound document MUD instructions (software) and data, such as a container part and a content part of a document. The data can include document information, such as text, graphics, spreadsheets, etc. The term "coupled" encompasses direct and indirect connection. Thus, if A is connected to B, and B is connected to C, then A is said to be "coupled" to B, and A is also said to be "coupled" to C. The server compound document MUD instructions are adapted to be executed on processor to perform at least part of the method in accordance with an embodiment of the present invention. For example, instructions are adapted to be executed by processor to host a multi-user domain using a compound document framework in accordance with a given concurrency model, receive from a client a part modification signal for a component of the compound document such as a content part, modify the part of the compound document in accordance with the part modification signal, and send modification information about how the part was modified to a client that is participating in the multi-user domain. The modification information is sent in accordance with the concurrency model. The server memory can also store part editor software.

Each client includes a client processor coupled to a client memory. The processor can be of the types described for the server processor, above, and the client memory is any device that is adapted to store digital information. The client memory should be at least partly writeable, and not only readable. The client memory stores client compound document MUD instructions, which are adapted to perform client-side shared container functions in accordance with the an embodiment of the present invention. The client memory can also store data such as a shared container part, a shared content part, concurrency information, etc. The client memory can also store part editor software. The client also includes port, coupled to the client processor, that is adapted to be coupled to a network.

By implementing a MUD using a compound document architecture, the MUD is advantageously integrated into the desktop, application software is advantageously reused and leveraged, and users can advantageously use familiar graphical user interfaces in the context of the MUD to perform tasks in the same way in the shared, distributed MUD context as locally on their desktops.

What is claimed is:

1. A method for modifying a compound document, including:
   a. hosting a multi-user domain using a compound document framework in accordance with a given concurrency model;
   b. receiving from a first client a part modification signal for a component of the compound document;
   c. modifying the component of the compound document in accordance with the part modification signal; and
   d. sending modification information to a second client that is participating in the multi-user domain in accordance with the concurrency model.

2. The method of claim 1, wherein the multi-user domain includes a shared container part of the compound document.

3. The method of claim 1, wherein receiving a part modification signal includes receiving a concurrency signal that describes how the modification described by the part modification signal is to be shared among the participating clients.

4. The method of claim 1, wherein receiving a part modification signal includes receiving an identifier of the part of the compound document to be modified, and an instruction describing how to modify the compound document.

5. The method of claim 1, wherein the compound document includes at least one type of part from the group of: a static part, a background part, a single user part, a single thread part, and a fully concurrent part.

6. The method of claim 1, wherein the hosted multi-user domain supports part editors including at least one from the group of: a text editor, a graphic editor, a spreadsheet editor, an audio editor, a video editor, a software development editor and an animation editor.

7. The method of claim 6, wherein a part editor is encapsulated in a wrapper, wherein the part editor is not entirely adapted to function in a distributed environment, and wherein the wrapper acts as an interface between the part editor and the distributed environment.

8. A system for modifying a compound document, including:

a client having a client processor executing client compound document multi-user domain software and client memory that stores a copy of a shared container part of a compound document, a shared content part of the compound document, and a client part editor; and a server having a server processor executing server compound document multi-user domain software and server memory that stores a copy of the shared container part of the compound document, a shared content part of the compound document, and a server part editor, wherein said server receives a part modification signal from said client, modifies a shared part of the compound document, and sends a signal to the client updating the client's copy of the modified shared part of the compound document.

9. The system of claim 8, wherein the client compound document multi-user domain software and the server compound document multi-user domain software send information about the shared part of the compound document in accordance with a concurrency model.

10. The system of claim 9, wherein the concurrency model describes each of a plurality of parts of the compound document as one from the group of: a static part, a background part, a single user part, a single thread part, and a fully concurrent part.

11. The system of claim 8, wherein the client part editor is encapsulated in a client part wrapper that interfaces with the server part editor.

12. The system of claim 8, wherein the server part editor is encapsulated in a server part wrapper that interfaces with the client part editor.

13. The system of claim 8, wherein a client or server part editor is one from the group of: a text editor, a graphic editor, a spreadsheet editor, an audio editor, a video editor, a software development editor and an animation editor.

14. A medium storing instructions adapted to be executed by a processor to host a multi-user domain at a server, wherein the multi-user domain includes a compound document, wherein the compound document includes a container part and a content part, and wherein the processor executes the instructions to:

receive a document modification signal from a client participating in the multi-user domain;

modify the document in accordance with the document modification signal; and send information about the document modification to a plurality of clients participating in the multi-user domain.

15. The medium of claim 14, wherein the multi-user domain includes rooms, and wherein a compound document is included in a room.

16. The medium of claim 14, wherein the document modification signal is only received from clients accessing a room in which the document is included in the multi-user domain.

17. The medium of claim 14, wherein the instructions include a part editor for modifying the document in accordance with the document modification signal.

18. The medium of claim 17, wherein the part editor is one from the group of: a text editor, a graphic editor, a spreadsheet editor, an audio editor, a video editor, a software development editor and an animation editor.

19. The medium of claim 14, wherein the instructions are adapted to be executed by the processor to send information about the document modification to a plurality of clients in accordance with a concurrency model.

20. The medium of claim 14, wherein the instructions are adapted to be executed by the processor to implement a concurrency model by assigning to a concurrency part type to a part of the compound document, wherein the concurrency part type is one from the group of: a static part, a background part, a single user part, a single thread part, and a fully concurrent part.

* * * * *